United States Patent
Ochiai et al.

(10) Patent No.: US 9,707,913 B1
(45) Date of Patent: Jul. 18, 2017

(54) SYSTEM AND METHOD FOR DETERMINING OPTIMAL VEHICLE COMPONENT SETTINGS

(71) Applicant: Toyota Motor Engineering & Manufacturing North America, Inc., Erlanger, KY (US)

(72) Inventors: Yuichi Ochiai, Cupertino, CA (US); Katsumi Nagata, Foster, CA (US); Akira Sasaki, San Jose, CA (US)

(73) Assignee: Toyota Motor Enegineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/078,476

(22) Filed: Mar. 23, 2016

(51) Int. Cl.
  *B60N 2/02* (2006.01)
  *B60W 40/08* (2012.01)
  *B60R 16/03* (2006.01)
  *B60R 16/037* (2006.01)

(52) U.S. Cl.
  CPC .......... *B60R 16/037* (2013.01); *B60N 2/0248* (2013.01); *B60W 40/08* (2013.01); *B60W 2040/0872* (2013.01)

(58) Field of Classification Search
  CPC ... B60R 16/037; B60W 40/08; B60W 2/0248; B60W 2040/0872
  See application file for complete search history.

(56) References Cited

U.S. PATENT DOCUMENTS

| | | |
|---|---|---|
| 5,808,374 A | 9/1998 | Miller et al. |
| 6,430,488 B1 | 8/2002 | Goldman et al. |
| 6,460,926 B1 * | 10/2002 | Neale ....................... B60N 2/48 297/216.12 |
| 6,505,780 B1 | 1/2003 | Yassin et al. |
| 6,775,603 B2 | 8/2004 | Yester et al. |
| 6,944,282 B1 | 9/2005 | Pietruszka |
| 7,139,660 B2 | 11/2006 | Sarkar et al. |
| 7,170,400 B2 | 1/2007 | Cowelchuk et al. |
| 7,912,625 B2 | 3/2011 | Cahoon |
| 8,370,030 B1 | 2/2013 | Gurin |
| 8,514,825 B1 | 8/2013 | Addepalli et al. |
| 8,634,822 B2 | 1/2014 | Silver et al. |

(Continued)

FOREIGN PATENT DOCUMENTS

| | | |
|---|---|---|
| JP | 2003-237504 | 8/2003 |
| JP | 2010274878 A * | 12/2010 |
| JP | 2004-276868 | 10/2014 |

*Primary Examiner* — Rodney Butler
(74) *Attorney, Agent, or Firm* — Snell & Wilmer LLP

(57) ABSTRACT

Described herein is a system for setting a component of a vehicle for a driver or passenger, such as a vehicle seat or mirror, to increase driver and/or passenger safety. The system includes a vehicle component having at least one user-adjustable setting, such as a recline angle for a seat back. The system also includes a sensor, such as a camera or force sensor, configured to detect body measurement data corresponding to a physical attribute of a user. For example, the body measurement data may include a height, a weight or the like. The system also includes an electronic control unit (ECU) coupled to the vehicle component and the sensor. The ECU is designed to determine an optimal setting for the vehicle component based on the body measurement data. The ECU can also control the vehicle component to have the optimal setting.

15 Claims, 6 Drawing Sheets

(56) References Cited

U.S. PATENT DOCUMENTS

| | | |
|---|---|---|
| 8,635,018 B2 | 1/2014 | Chia et al. |
| 8,818,725 B2 | 8/2014 | Ricci |
| 9,014,888 B2 | 4/2015 | Sukkarie et al. |
| 9,092,309 B2 | 7/2015 | MacNeille et al. |
| 9,104,537 B1 | 8/2015 | Penilla et al. |
| 2002/0081985 A1 | 6/2002 | Liu et al. |
| 2003/0162523 A1 | 8/2003 | Kapolka et al. |
| 2004/0010358 A1 | 1/2004 | Oesterling et al. |
| 2004/0092253 A1 | 5/2004 | Simonds et al. |
| 2006/0015221 A1 | 1/2006 | Sarkar et al. |
| 2006/0038447 A1 | 2/2006 | Bruelle-Drews |
| 2006/0155439 A1 | 7/2006 | Slawinski et al. |
| 2006/0258377 A1 | 11/2006 | Economos et al. |
| 2007/0208860 A1 | 9/2007 | Zellner et al. |
| 2007/0208861 A1 | 9/2007 | Zellner et al. |
| 2007/0255464 A1 | 11/2007 | Singh et al. |
| 2008/0246318 A1* | 10/2008 | Bothe ............ B60N 2/0252 297/217.3 |
| 2009/0055178 A1 | 2/2009 | Coon |
| 2010/0156712 A1 | 6/2010 | Pisz et al. |
| 2010/0228404 A1 | 9/2010 | Link et al. |
| 2011/0106375 A1 | 5/2011 | Gurusamy Sundaram |
| 2011/0112969 A1 | 5/2011 | Zaid et al. |
| 2011/0137520 A1 | 6/2011 | Rector et al. |
| 2011/0145089 A1 | 6/2011 | Khunger et al. |
| 2011/0195699 A1 | 8/2011 | Tadayon et al. |
| 2012/0232747 A1 | 9/2012 | Miners et al. |
| 2012/0252364 A1 | 10/2012 | Inabathuni et al. |
| 2013/0151035 A1* | 6/2013 | Park ............ B60R 16/037 701/2 |
| 2013/0158778 A1 | 6/2013 | Tengler et al. |
| 2013/0191018 A1 | 7/2013 | Siereveld et al. |
| 2013/0204455 A1 | 8/2013 | Chia et al. |
| 2013/0238167 A1 | 9/2013 | Stanfield et al. |
| 2014/0067201 A1 | 3/2014 | Visintainer et al. |
| 2014/0266623 A1* | 9/2014 | Graumann ............ B60K 28/02 340/10.1 |
| 2014/0319895 A1* | 10/2014 | Lange-Mao ............ B60N 2/002 297/463.1 |
| 2014/0379169 A1* | 12/2014 | Camacho ............ B60R 16/037 701/2 |
| 2015/0057839 A1 | 2/2015 | Chang et al. |
| 2015/0066246 A1 | 3/2015 | Martin |
| 2015/0088337 A1 | 3/2015 | Toohy et al. |
| 2015/0112512 A1 | 4/2015 | Fan et al. |
| 2016/0325755 A1* | 11/2016 | Ricci ............ B60W 40/08 |
| 2016/0355193 A1* | 12/2016 | Chen ............ B60R 16/037 |

* cited by examiner

| WEIGHT CLASS (POUNDS) | TORSO LENGTH (INCHES) | LEG LENGTH (INCHES) | SEAT RECLINE (DEGREES) | | | HEADREST HEIGHT (INCHES) | | |
|---|---|---|---|---|---|---|---|---|
| | | | ACCEPTABLE RANGE | | OPTIMAL SETTING | ACCEPTABLE RANGE | | OPTIMAL SETTING |
| | | | MIN | MAX | | MIN | MAX | |
| 195-205 | 26-30 | 26-30 | -10 | 15 | 5 | 30 | 34 | 32 |
| | | 30-34 | -9 | 17 | 6 | 30 | 34 | 32 |
| | | 34-38 | -8 | 19 | 8 | 30 | 34 | 32 |
| | | 38-42 | -7 | 21 | 9 | 30 | 34 | 32 |
| | 30-34 | 26-30 | -9 | 13 | 4 | 34 | 38 | 36 |
| | | 30-34 | -8 | 15 | 5 | 34 | 38 | 36 |
| | | 34-38 | -7 | 17 | 6 | 34 | 38 | 36 |
| | | 38-42 | -6 | 19 | 7 | 34 | 38 | 36 |

FIG. 5

SYSTEM AND METHOD FOR DETERMINING OPTIMAL VEHICLE COMPONENT SETTINGS

BACKGROUND

Field

The present disclosure relates to systems and methods for automatically determining optimal settings of vehicle components based on body measurements of a driver or a passenger of a vehicle and for applying the optimal settings to a corresponding component of another vehicle.

Description of the Related Art

Vehicles include multiple adjustable components such as a seat that has various adjustable portions, heating ventilation and air conditioning (HVAC) systems that can be controlled to blow air at a desired temperature and humidity, mirrors that may be adjusted to provide various viewing angles for areas outside of the vehicle and the like. Traditionally, all of these adjustable components were controlled mechanically by a driver or a passenger. For example, a driver would pull a lever and manually adjust the angle of a seat back by applying greater or lesser force.

Due to the advancements of electrical technology, many of these components are now electrically controlled using switches, knobs, dials and other input devices. Continuing the seat example, a driver now can adjust the angle of the seat back by controlling a motor to actuate the seat back by pushing a switch in a particular direction. Due to the electrical component of component setting adjustments, particular settings for components can be stored in a memory for later use.

Drivers often have preferences for the settings for these components. For example, some drivers prefer to sit upright at a 90 degree angle while other drivers prefer to recline while driving. Unbeknownst to many drivers, however, is the fact that some component settings can increase the risk of harm to drivers. For example, if a headrest of a seat back is positioned too low for a particular driver, the driver is more susceptible to whiplash than if the headrest is properly positioned. Furthermore, if a seat back is reclined at too great of an angle, the driver is more susceptible to breaking his legs in a crash than if the seat back angle is more upright.

Thus, there is a need for systems and methods for increasing the likelihood of vehicle components being set to optimal settings for the safety of vehicle drivers and passengers.

SUMMARY

Described herein is a system for setting a component of a vehicle for a driver or a passenger, such as a vehicle seat or a mirror. The system includes a vehicle component having at least one user-adjustable setting, such as a recline angle for a seat back. The system also includes a sensor, such as a camera or a force sensor, configured to detect body measurement data corresponding to a physical attribute of the driver or the passenger. For example, the body measurement data may include a height, a weight or the like of a person. The system also includes an electronic control unit (ECU) coupled to the vehicle component and the sensor. The ECU is designed to determine an optimal setting for the vehicle component based on the body measurement data. The ECU can also control the vehicle component to have the optimal setting.

Also described is a system for setting a component of a vehicle for a driver or a passenger. The system includes a vehicle component having at least one user-adjustable setting. The system also includes an input device configured to receive body measurement data corresponding to a physical attribute of the driver or the passenger. The system also includes an electronic control unit (ECU) coupled to the vehicle component and the input device. The ECU is designed to determine an optimal setting for the vehicle component based on the body measurement data and to control the vehicle component to have the optimal setting.

Also described is a method for setting and storing a user preference for a first component of a first vehicle and for implementing the user preference for a second component of a second vehicle. The method includes receiving, by a first input device of the first vehicle, an identifier of a user of the first vehicle. The method also includes receiving, by a first electronic control unit (ECU), body measurement data corresponding to a physical attribute of the user. The method also includes determining, by the first ECU, an optimal setting of the first component for the user based on the body measurement data. The method also includes transmitting, by a first network access device of the first vehicle, the identifier of the user and the optimal setting of the first component to a cloud. The method also includes receiving, by a second input device of the second vehicle, the identifier of the user. The method also includes transmitting, by a second network access device of the second vehicle, the identifier of the user to the cloud. The method also includes receiving, by the second network access device of the second vehicle, the optimal setting of the vehicle component based on the transmitted identifier of the user. The method also includes controlling, by a second ECU of the second vehicle, a setting of the second component of the second vehicle based on the received optimal setting of the first component of the first vehicle.

BRIEF DESCRIPTION OF THE DRAWINGS

The features, obstacles, and advantages of the present invention will become more apparent from the detailed description set forth below when taken in conjunction with the drawings, wherein:

FIG. 5 is a table illustrating optimal settings and acceptable ranges of settings for a seat of the vehicle of FIG. 1 for various body measurements of a driver according to an embodiment of the present invention.

DETAILED DESCRIPTION

Described herein are systems and methods for automatically determining an optimal setting for a vehicle component of a first vehicle and automatically applying the optimal setting to the first vehicle and/or to a second vehicle. The optimal setting is an automatic setting (i.e., non-user controlled or ECU controlled) for the vehicle component that is determined for a particular individual and is a setting that provides increased safety, functionality and/or comfort to the driver relative to other settings of the vehicle component. The systems and methods provide several benefits and advantages such as increasing driver safety by determining the optimal setting based on the driver's particular body measurements. The systems and methods provide additional benefits and advantages such as further increasing driver safety by warning the driver if a component has a setting that the system determines is not optimal and/or may not be safe. The systems and methods provide further benefits and advantages such as determining the optimal component setting without any effort on the part of the driver so that the driver can focus on driving. The systems and methods provide additional benefits and advantages such as storing the determined optimal setting in the cloud such that another vehicle can apply the optimal settings automatically, further increasing the driving experience for the driver.

An exemplary system includes at least one adjustable component, such as a driver seat. The system also includes one or more sensors or cameras capable of detecting data corresponding to the driver's body, such as a height or a weight. The system also includes a network access device capable of communicating with the cloud. The system also includes an electronic control unit (ECU) coupled to the at least one component, the one or more sensors and the network access device. The ECU can determine an optimal setting for the at least one component based on the data corresponding to the user's body. The optimal setting corresponds to a setting of the component that results in increased safety for the driver. The ECU can also control the component to have the optimal setting and can upload the optimal setting to the cloud. The ECU can also receive an optimal setting for another driver from the cloud and control the component to have the optimal setting for the other driver.

Figure 1:
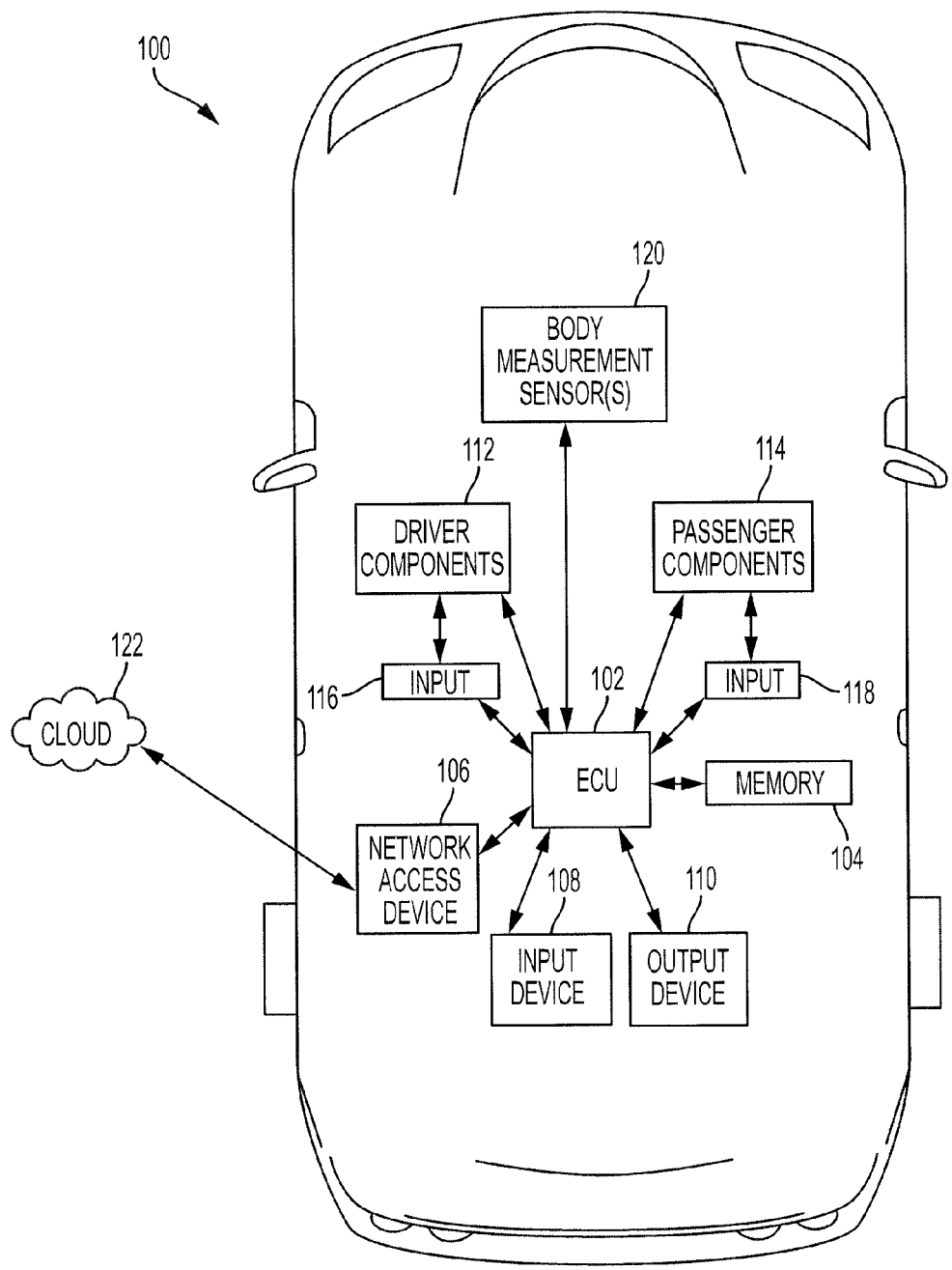
FIG. 1 is a block diagram of a vehicle having adjustable components such as mirrors, seats and the like according to an embodiment of the present invention.

Turning to FIG. 1, a vehicle 100 (or can be a system 100) includes features for automatically controlling one or more components based on a user identifier and/or body measurement data of the user. The vehicle 100 may include an ECU 102, a memory 104, a network access device 106, an input device 108 and an output device 110. The vehicle 100 may also include one or more driver components 112 and one or more passenger components 114, along with an input device 116 for the driver components 112 and an input device 118 for the passenger components 114. The vehicle 100 may also include one or more body measurement sensors 120 that can detect data corresponding to one or more body parts of the driver and/or the passenger.

The ECU 102 can include one or more processors or controllers which may be specifically designed for automotive systems. The functions of the ECU 102 can be implemented in a single ECU or in multiple ECUs. The ECU 102 may receive data from the components of the vehicle 100, may make deteirminations based on the received data and may control the operation of the components of the vehicle 100 based on the determinations and the received data.

The memory 104 may include any non-transitory memory known in the art. The memory 104 may store machine-readable instructions usable by the ECU 102 and may store any other data as requested by the ECU 102.

The network access device 106 may include any device capable of communicating with an external device or a network. For example, the network access device 106 may communicate with the cloud 122 via 3G protocols, 4G protocols, 802.11 (Wi-Fi) protocols or the like.

In some embodiments, the network access device 106 may also or instead include an input/output (I/O) port. In that regard, the network access device 106 may connect to other vehicles or devices (not shown) via a wired or wireless interface. For example, the network access device 106 may be a USB port, a Wi-Fi port, a Bluetooth port, a Dedicated Short-Range Communications (DSRC, usable in vehicle-to-infrastructure or vehicle-to-vehicle communications) port or the like. The network access device 106 may transmit data to and receive data from an external device such as a mobile phone (not shown) or a telematics device (not shown), which may in turn communicate with the cloud 122 or other vehicles (not shown). In that regard, the ECU 102 can communicate with the cloud 122 via the network access device 106 and the mobile phone.

The input device 108 may include any input device capable of receiving user input. For example, the input device 108 may include a button, a knob, a dial, a touch-screen, a touchpad, a microphone or the like. The input device 108 may be coupled to the ECU 102 such that the ECU 102 can receive user input. The input device 108 may receive user input such as body measurement data corresponding to one or more physical attributes of a user.

The output device 110 may include any output device capable of outputting data to a user. For example, the output device 110 may include a speaker, a display, a touchscreen, a refreshable braille display or the like.

The driver components 112 may include any component of the vehicle that the driver interfaces with. For example, the driver components 112 may include a driver seat, a steering wheel, mirrors, a heating ventilation and air conditioning (HVAC) system, a telematics unit (including Bluetooth connectivity and/or an audio system), a navigation device or system, an autonomous driving system or a semi-autonomous driving system or the like.

The driver component input device 116 may include any input device that the driver may use to change settings of the driver components 112. For example, the driver component input device 116 may include a set of knobs or dials coupled to the driver's seat that can be used to change the position of the driver's seat. The driver component input device 116 may also or instead include one or more of a device for changing a position of the steering wheel, a knob or dial for changing a position of the mirrors, a touchscreen or other interface for controlling the HVAC, the telematics unit, the navigation device or system, the autonomous driving system and/or the semi-autonomous driving system or the like.

The passenger components 114 may include similar components as the driver components 112. For example, the passenger components 114 may include a passenger seat, a portion of the HVAC system that can be used to adjust the airflow to the passenger side of the vehicle cabin, or the like. In some embodiments, some components that are shared by the driver and the passenger may be considered one or both of driver components or passenger components. For example, the telematics unit and the HVAC system may be considered driver components, may be considered passenger components or may be consider driver and passenger components.

In some embodiments, the ECU 102 may determine whether a particular component is a driver component or a passenger component based on logic or a logical operation. For example, the ECU 102 may be aware of the presence of a passenger in the vehicle 100 such as via a camera. If no passenger is present, the ECU 102 may cause all HVAC controls to be driver components. However, if a passenger is present, the ECU 102 may cause portions of the HVAC controls that affect the driver side of the vehicle 100 (such as air blowing through a vent on the driver side) to be driver components and cause portions of the HVAC controls that affect the passenger side of the vehicle 100 (such as air blowing through a vent on the passenger side) to be passenger components.

In some embodiments, the determination of which components are driver components and which components are passenger components may be programmed into the ECU 102 (i.e., selected by the vehicle manufacturer). In some embodiments, a driver or a passenger can control the ECU 102 to select which components are driver components and which components are passenger components.

As with the driver component input device 116, the passenger component input device 118 may be used to control settings of the passenger components 114. For example, the passenger component input device 118 may include knobs or dials coupled to the passenger's seat and that are usable to adjust the position of the passenger's seat.

Body measurement sensors 120 may include any sensor or sensors capable of detecting data corresponding to the driver's body or the passenger's body. For example, the body measurement sensors 120 may include a pressure sensor usable to detect a weight of a driver or a passenger, cameras or sensors configured to detect a height or other distance measurement of the driver's body or the passenger's body, or the like.

Figure 2:
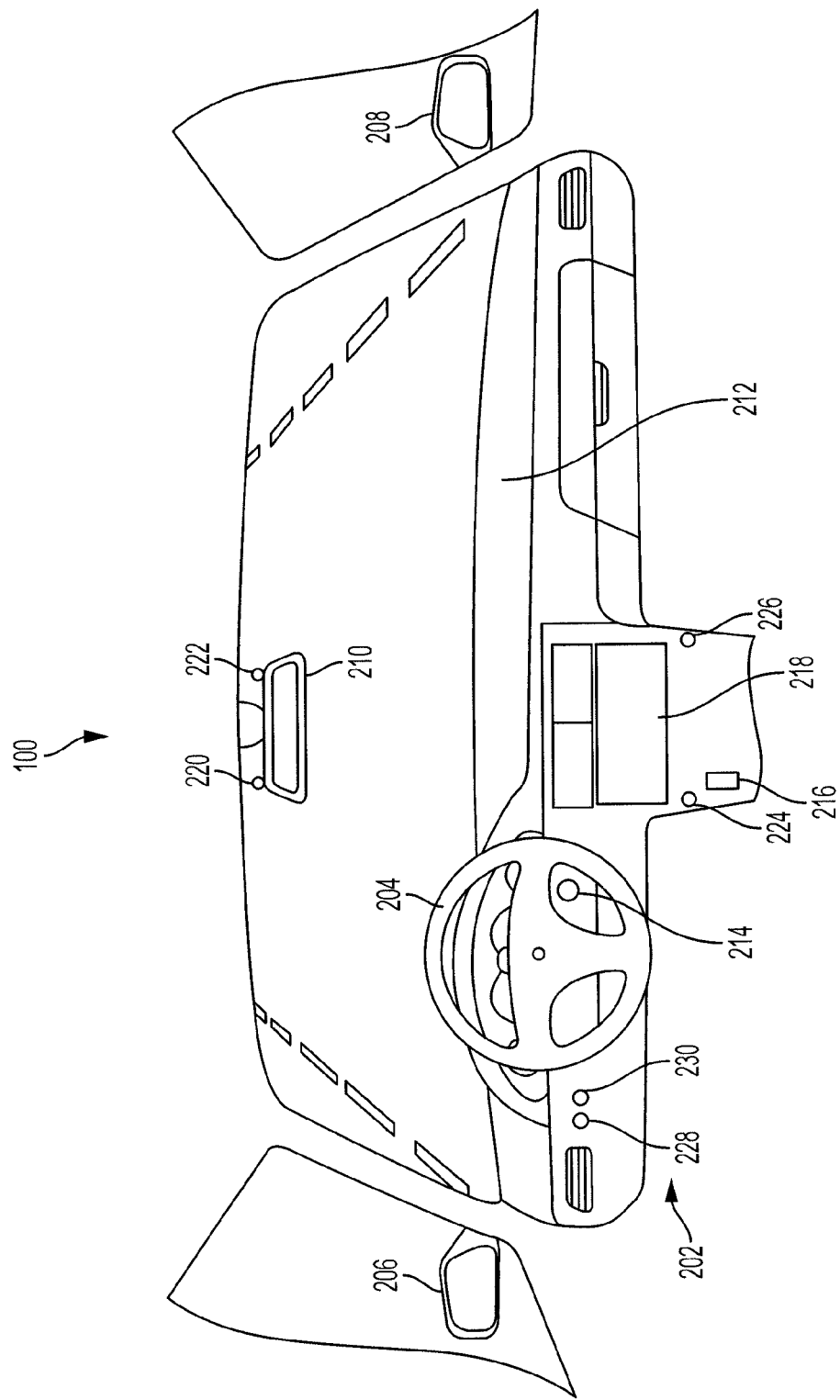
FIG. 2 is a drawing of a cabin of the vehicle of FIG. 1 showing various adjustable components and sensors for detecting body measurement data of a driver and a passenger according to an embodiment of the present invention.

Turning now to FIG. 2, a cabin 202 of the vehicle 100 is shown. As shown, the vehicle 100 also includes a steering wheel 204, a driver side mirror 206, a passenger side mirror 208 and a rearview mirror 210. Each of these components may be electronically controlled by the driver. For example, a knob 228 may be usable by the driver to control an actuator to adjust the position of the driver side mirror 206 and the position of the passenger side mirror 208. A second knob 230 may be usable by the driver to control an actuator to adjust the position of the steering wheel 204 relative to a dashboard 212.

Referring to FIGS. 1 and 2, the vehicle 100 may also include a device for detecting an identifier of the driver. For example, the vehicle 100 may include a key slot 214. The key slot 214 may include electronics for detecting an identifier associated with a particular key. For example, when the driver inserts his key into the key slot 214, the electronics of the key slot 214 may detect the key and the ECU 102 may determine that the key is associated with a first driver. If a second driver of the vehicle has a separate key, the electronics of the key slot 214 may detect this key and the ECU 102 may determine that the separate key is associated with the second driver.

In some embodiments, the vehicle 100 may include a sensor pad 216 that can detect data corresponding to the driver's fingertip. When the driver enters the vehicle 100, the driver may place his fingertip against the sensor pad 216. The sensor pad 216 may detect data corresponding to the driver's fingerprint. The ECU 102 may compare the detected fingerprint to a database of fingerprints stored in the memory 104 or stored in the cloud 122 and accessed via the network access device 106. The ECU 102 may identify the driver based on a match between the detected fingerprint from the sensor pad 216 and a fingerprint stored in the memory 104 or in the cloud 122.

In some embodiments, the vehicle 100 may identify a user using another method or device. For example, the vehicle may interface with a mobile device of the driver, such as a mobile phone or a wearable device, and identify the driver based on the identity of the mobile device. In some embodiments, the vehicle 100 may include a microphone designed to detect data corresponding to the driver's speech. The ECU 102 may analyze the detected speech and identify the driver based on his voice or speech pattern. In some embodiments, the vehicle 100 may include a camera or other device capable of detecting any other biometric of the driver, such as a fingerprint, an eye scan, a face structure, and identifying the driver therefrom. The ECU 102 may also identify the driver based on any other device, or may identify the driver based on input data from the driver.

Returning to FIG. 2, the vehicle 100 may include a touchscreen 218. The driver and/or passenger can interface with the touchscreen 218. For example, the touchscreen 218 may receive user input and display output data. In some embodiments, the driver and/or the passenger may input body measurement data using the touchscreen 218.

The vehicle 100 may include a plurality of cameras as body measurement sensors. For example, the vehicle 100 may include an upper driver camera 220, an upper passenger camera 222, a lower driver camera 224 and a lower passenger camera 226. The upper driver camera 220 may be coupled to the rearview mirror 210 and positioned in such a way as to detect image data corresponding to the driver's upper body. The upper driver camera 220 may detect upper body measurement data such as a torso length of the driver, an arm length of the driver, an eye position of the driver, a shoulder width of the driver, a neck length of the driver or the like.

The upper passenger camera 222 may also be coupled to the rearview mirror 210 and be designed to detect upper body measurement data of the passenger. The upper driver camera 220 and the upper passenger camera 222 may be positioned at any other location in the vehicle 100 from which they can detect data corresponding to the upper body of the driver and passenger, respectively.

The lower driver camera 224 may be coupled to the dashboard 212 or positioned at any other location within the cabin 202 from which it can detect data corresponding to the driver's lower body. For example, the lower driver camera 224 may detect lower body measurement data such as a leg length, a waist size or the like of the driver. The lower passenger camera 226 may also be coupled to the dashboard 212 or other location and designed to detect data corresponding to the passenger's lower body.

Figure 3:
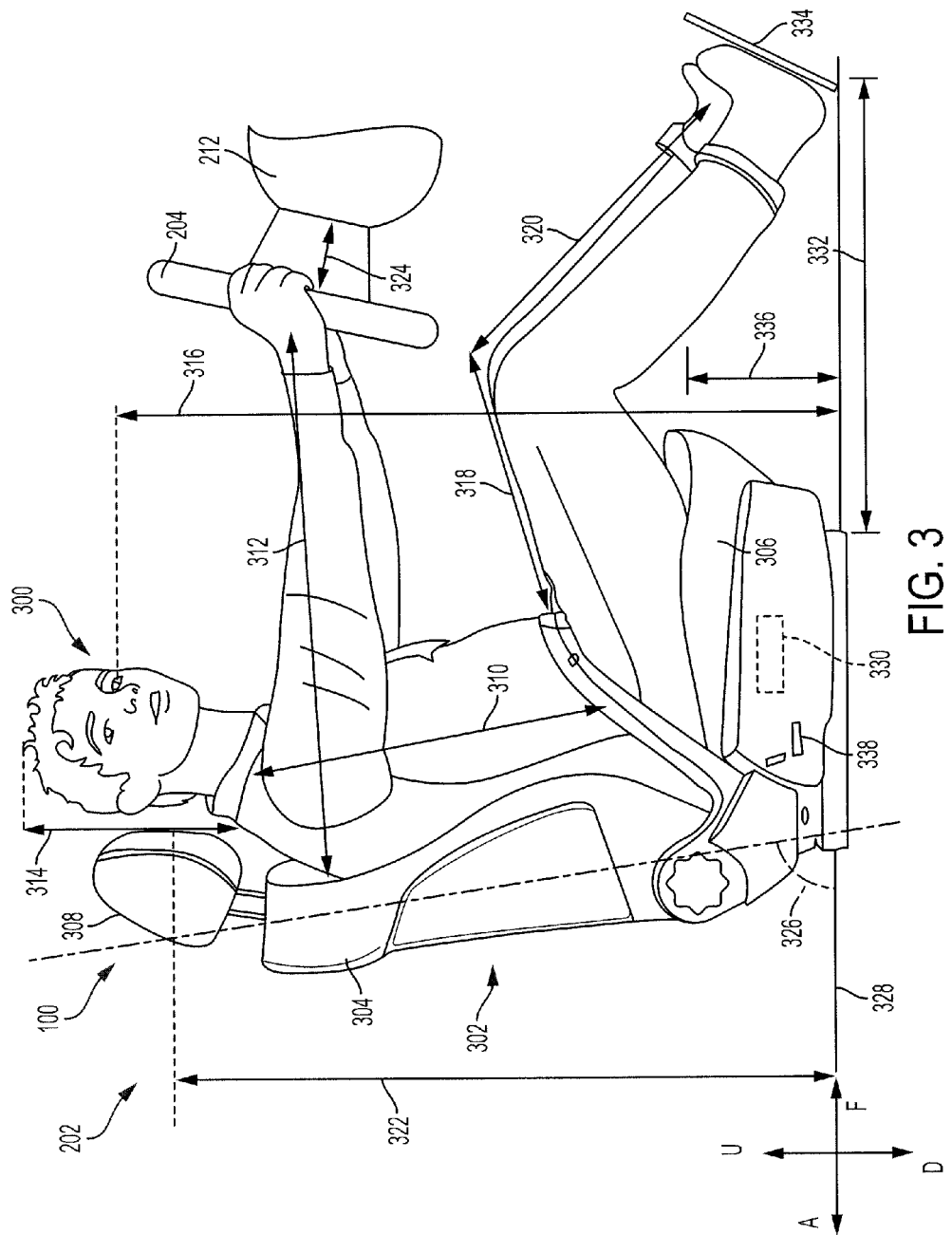
FIG. 3 is a drawing of a side view of a driver in a driver seat of the vehicle of FIG. 1 showing additional adjustable components according to an embodiment of the present invention.

Turning now to FIG. 3, a driver 300 is shown sitting in a driver's seat 302 within the cabin 202. The driver's seat 302 includes a back portion 304, a lower portion 306 and a headrest 308. An up, down, forward and aft axis is shown to illustrate relative positioning of the components.

Referring to FIGS. 2 and 3 and as described herein, the upper driver camera 220 and the lower driver camera 224 are designed to detect various upper body measurement data and lower body measurement data of the driver 300. For example, the upper driver camera 220 may detect a torso length 310 of the driver 300 corresponding to a length of the driver's torso. The upper driver camera 220 may also detect an arm length 312 and a head length 314 of the driver. The upper driver camera 220 may also detect a position of the driver's eyes 316. The position of the driver's eyes 316 may be measured as a distance between a floor panel 328 of the vehicle and the driver's eyes. In some embodiments, the position of the driver's eyes may be measured relative to another component of the vehicle 100 such as a location on the dashboard 212.

The lower driver camera 224 may detect lower body measurement data such as a leg length of the driver 300. In some embodiments, the lower driver camera 224 may detect an upper leg length 318 and a lower leg length 320. The upper driver camera 220 and/or the lower driver camera 224 may detect any other body measurement data of the driver 300 such as a stomach size, a waist size, a shoulder to shoulder distance or the like.

The vehicle 100 may also include a force sensor 330 positioned within the lower portion 306 of the seat 302. The force sensor 330 is positioned such that it can detect data corresponding to a weight of the driver 300. The weight of the driver 300 may also be regarded as body measurement data.

Because body shapes and sizes are different for various drivers and passengers, the optimal settings for each component may vary from person to person. Most drivers are aware that they can adjust the component settings to increase their comfort in the vehicle. However, many drivers are unaware of the safety or lack thereof that can result from using settings other than the optimal settings. For example, certain seat positions may make a driver more prone to injuries such as fractured bones, whiplash or the like. The vehicle 100 is designed to compensate for this lack of awareness of the optimal settings by determining the optimal settings for each particular user and controlling or setting the component to have the optimal settings.

Referring to FIGS. 1, 2 and 3, after receiving the body measurement data via the touchscreen 218 and/or detecting body measurement data via the cameras and other sensors, the ECU 102 may determine optimal settings for one or more components of the vehicle based on the received and/or detected body measurement data.

For example, the ECU 102 may determine optimal angles at which to set the driver side mirror 206 and the passenger side mirror 208 based on data such as the location of the driver's eyes 316. The ECU 102 may also determine an optimal headrest height 322 based on data such as the location of the driver's eyes, the torso length 310, the head length 314 or the like. The optimal headrest height 322 may correspond to a distance of the headrest 308 relative to another component, such as a floor panel 328.

In some embodiments, the upper driver camera 220 may detect data corresponding to the position of the headrest 308 relative to the head of the driver 300. The ECU 102 may use this relative positioning to determine the optimal headrest height 322 and/or to adjust a previously determined optimal headrest height 322.

The ECU 102 may also determine an optimal steering wheel position 324. The optimal steering wheel position 324 may correspond to a distance between the steering wheel 204 and the dashboard 212 and/or a distance between the steering wheel 204 and the floor panel 328. The ECU 102 may also determine an optimal seatback angle 326 corresponding to an angle between the back portion 304 of the seat 302 and a reference point such as the floor panel 328.

The ECU 102 may also determine an optimal seat distance 332 corresponding to a relative location of the seat 302 within the vehicle cabin 202. For example, the optimal seat distance 332 may correspond to a distance between a fixed location on the lower portion 306 of the seat 302 and a leading edge of an accelerator pedal 334. The ECU 102 may also determine an optimal seat height 336 corresponding to a distance between the top of the lower portion 306 of the seat 302 and the floor panel 328.

After determining the optimal settings for the vehicle components, the ECU 102 may control the components to have the optimal settings. In some embodiments, the driver 300 may wish to further adjust the settings of the components. For example, the driver 300 may adjust the position of the steering wheel using the second knob 230, may adjust the angle of the driver side mirror 206 and/or the passenger side mirror 208 using the knob 228, may adjust the position of the seat 302 using controls 338 coupled to the seat 302 or the like.

In some embodiments, the ECU 102 may determine an acceptable range of settings for each component in addition to the optimal setting. For example, the acceptable range of settings may correspond to settings of the components at which the risk of harm to the driver is below a risk threshold value. The risk threshold value may be a safety value above which injury to the driver is likely to occur. Stated differently, the risk threshold value may be a safety value below which injury to the driver is unlikely to occur. Thus, when a component setting is within the acceptable range of settings, injury to the driver may be unlikely to occur. As with the optimal component setting, the acceptable range of settings for a particular individual is determined based on the received or detected body measurement data. The risk threshold value may be determined by the vehicle designers and used to set the acceptable range of settings.

Figure 4:
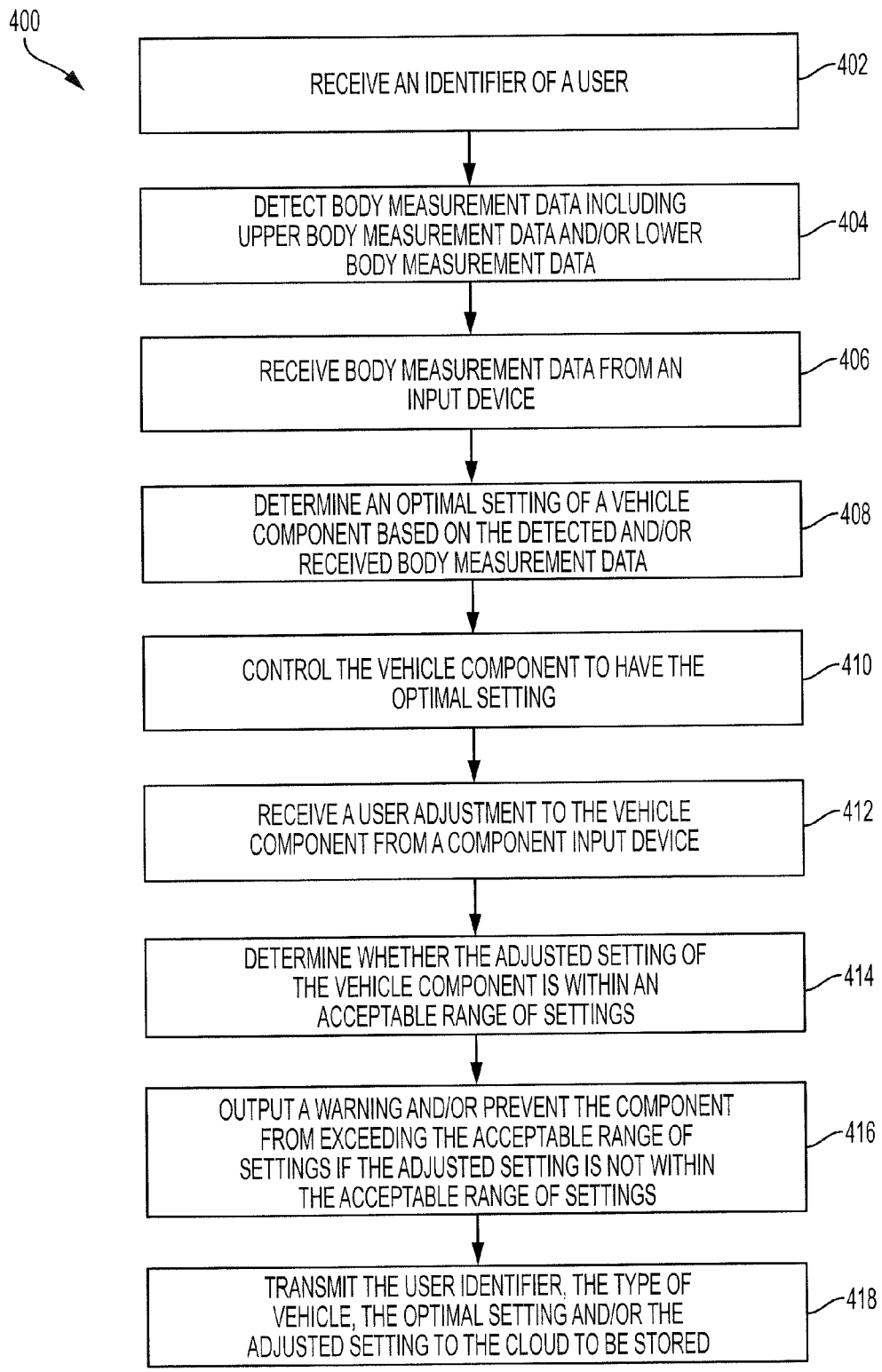
FIG. 4 is a flowchart illustrating a method for determining an optimal setting for one or more components of the vehicle of FIG. 1 according to an embodiment of the present invention.

Turning now to FIG. 4, a method 400 for determining and storing an optimal setting for one or more vehicle components is shown. The method 400 may be performed by components of a vehicle, such as the ECU 102 of the vehicle 100 of FIG. 1. In block 402, an ECU may receive an identifier of a user, such as a driver or a passenger. As described above, the identifier may be received in various manners such as via connecting to a personal Bluetooth device, detection of a biometric, a user entering an identifier using an input device or the like.

In block 404, sensors of the vehicle may detect body measurement data. The body measurement data may include upper body measurement data and/or lower body measurement data. In block 406, the ECU may receive body measurement data from an input device. For example, a user or an authorized agent at a dealership may measure the user's body to determine the body measurement data and may provide the body measurement data to the ECU via the input device.

In some embodiments, a dealership may include a measurement system capable of detecting the body measurement data. For example, the measurement system may include one or more cameras or other sensors, such as a force sensor, capable of detecting the body measurement data of the user. After this data has been detected by the measurement system, the body measurement data may be provided to the vehicle via a logical connection between the measurement system and the vehicle and/or via an input device from the user or the authorized agent.

A vehicle may be designed to receive body measurement data in one or more manners. For example, some vehicles may only receive body measurement data via an input device, some vehicles may only receive body measurement data logically via a connection to a measurement system, some vehicles may only include sensors for detecting body measurement data and some vehicles may include any combination of the above.

In block 408, the ECU may determine an optimal setting of a vehicle component based on the body measurement data. In some embodiments, the ECU may perform calculations using the body measurement data as inputs to determine the optimal setting of the vehicle component. In some embodiments, the ECU may have access to a table or a chart, such as in a memory, that provides the optimal setting of the vehicle component for various body measurement data.

In block 410, the ECU may automatically control or set the vehicle component to have the optimal setting. After the ECU controls the component to have the optimal setting, the user may further adjust the component. Thus, in block 412, the ECU may receive this user adjustment to a vehicle component.

In block 414, the ECU may determine whether the adjusted setting of the vehicle component is within an acceptable range of settings. In order to do so, the ECU may determine the acceptable range of settings for the driver based on the body measurement data. As with determining the optimal setting, the ECU may determine the acceptable range of settings by performing calculations using the body measurement data as input and/or may look up the acceptable ranges in a table or a chart. After determining the acceptable range of settings, the ECU may determine whether the adjusted setting of the vehicle component falls within the acceptable range of settings.

Turning to FIG. 5, a table 500 shows optimal component settings and acceptable ranges of component settings for various body measurement data. The body measurement data shown in the table 500 includes a weight, a torso length and a leg length, although body measurement data corresponding to any one or more body measurements may be used. The vehicle component associated with the table 500 is the driver's seat. The component settings include a seat recline angle and a headrest height. The seat recline angle may correspond to an angle between a back portion of the driver seat and a floorboard, and the headrest height may correspond to a distance between the floorboard and a specified location on the headrest.

The data shown in the table 500 corresponds to a driver having a weight between 195 pounds and 205 pounds. The table 500 may include more data than shown in FIG. 5, such as data corresponding to other weights. The optimal component setting and acceptable range of settings may be found by searching for the line in the chart having the body measurement data that corresponds to the driver's body measurement data.

A driver may be 200 pounds, have a torso length of 28 inches and a leg length of 32 inches. This body measurement data corresponds to line 502 of the table 500. The optimal seat recline angle is 6 degrees for this combination of body measurement data. The acceptable range of seat recline angles is between −9 degrees and 17 degrees. Furthermore, the optimal headrest height for this driver may be 32 inches above the floor panel. The acceptable range of headrest heights is between 30 inches and 34 inches above the floor panel.

Returning now to FIG. 4, if the adjusted setting of the vehicle component is not within the acceptable range of settings, the ECU may take an action in block 416. For example, the ECU may output a warning informing the driver that the current setting of the vehicle component is not within the acceptable range of settings and, thus, may be unsafe. By providing this warning, the ECU informs the driver of the potential safety issue of the current setting of the vehicle component, while allowing the driver to determine whether to further adjust the component.

In some embodiments, in order to increase safety, the ECU may prevent the vehicle component from having a setting outside of the acceptable range of settings. For example and referring again to FIG. 5, a driver's body measurement data may match the data indicated in line 502. The driver may attempt to recline the seat position from the optimal setting of 6 degrees to a much higher angle, such as 25 degrees. However, when the seat recline angle reaches 17 degrees, the ECU may prevent the seat from further reclining.

In some embodiments, the ECU may momentarily prevent any additional seat recline and provide a warning to the driver indicating that the current seat recline angle is the maximum angle within the acceptable range. If the driver continues to attempt to recline the seat, the ECU may allow the seat to continue reclining.

After the optimal setting has been determined and the user has made adjustments, it may be desirable to store the optimal setting and/or adjusted setting for the component in the cloud along with the corresponding user identifier. By having this information stored in the cloud, an ECU of a second vehicle may automatically adjust and/or set components of the second vehicle to have the optimal and/or adjusted settings.

For example, the second vehicle can identify the user based on an identifier and transmit the identifier to the cloud. The second vehicle may then receive the optimal and/or adjusted setting for one or more components from the cloud. The ECU of the second vehicle can then cause the components of the second vehicle to have the optimal and/or adjusted setting.

Returning now to FIG. 1, the vehicle 100 is also capable of controlling the driver components 112 and/or the passenger components 114 based on retrieved optimal and/or adjusted settings. For example, the optimal and/or adjusted settings may have been determined by an ECU of a second vehicle. The second vehicle may have transmitted the optimal and/or adjusted settings, along with the identifier of the driver, to the cloud 122 for storage.

When a driver initially enters the vehicle 100, the driver may provide an identifier, such as via the input device 108. The ECU 102 may transmit the identifier to the cloud 122 via the network access device 106 and receive the corresponding optimal and/or adjusted settings that were determined by the second vehicle. Upon receiving the optimal and/or adjusted settings from the cloud 122, the ECU 102 may cause the driver components 112 to have the optimal and/or adjusted settings.

Figure 6:
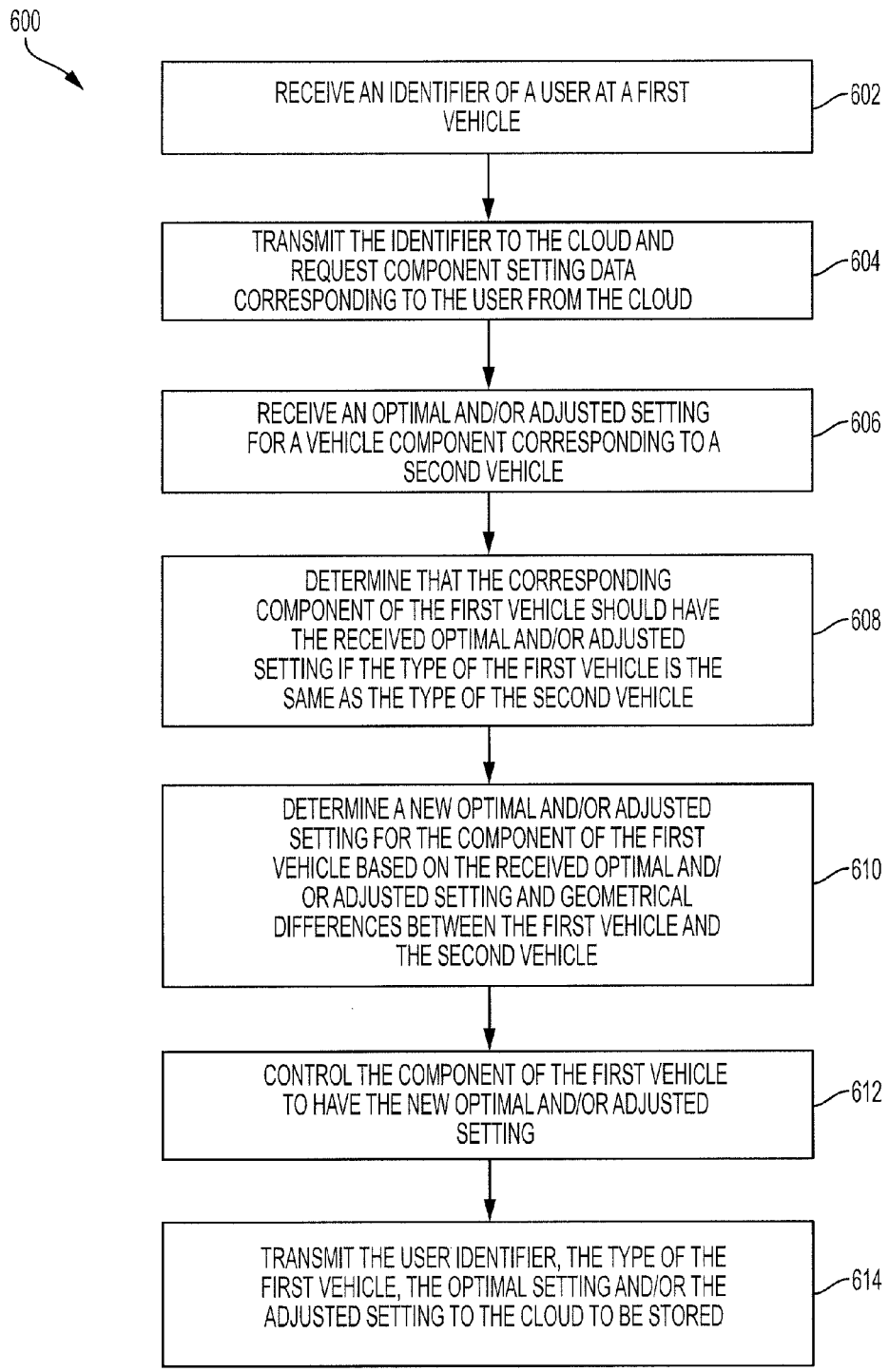
FIG. 6 is a flowchart illustrating a method for applying a previously determined and stored optimal setting of a vehicle component of a second vehicle to a corresponding vehicle component of a first vehicle according to an embodiment of the present invention.

Referring now to FIG. 6, a method 600 for controlling components of a vehicle, such as the vehicle 100 of FIG. 1, to have optimal and/or adjusted settings based on data stored in the cloud is shown. The method 600 may be performed by components of two vehicles having similar features as the vehicle 100 of FIG. 1.

In block 602, an input device of a first vehicle may receive an identifier of a user, such as the driver or the passenger. For example, an input device may receive the identifier and transmit the identifier to the ECU.

In block 604, the first vehicle may transmit the identifier to the cloud and request component setting data from the cloud via a network access device. The component setting data may include the optimal and/or adjusted settings that correspond to the identifier. In some embodiments, the component setting data may include the optimal setting and the user adjustment to the optimal setting. The optimal and/or adjusted setting refers to any of the optimal setting, the adjusted setting (the user-adjusted optimal setting) and/or the user adjustment to the setting.

In block 606, the first vehicle may receive the stored optimal and/or adjusted setting for one or more components from the cloud. For example, the ECU may receive the settings via the network access device. The received settings may correspond to a second vehicle. For example, the settings may have been determined by an ECU of the second vehicle and transmitted to the cloud for storage by a network access device of the second vehicle.

The first vehicle may be of the same or similar type as the second vehicle or may be a different vehicle type than the second vehicle. For example, the first vehicle and the second vehicle may each be a Toyota Corolla, or the first vehicle may be a Toyota Corolla and the second vehicle may be a Toyota Tundra or a Toyota 4Runner.

If the first vehicle and the second vehicle are of the same type (i.e., the same model style or year), then each setting of the second vehicle will directly correspond to the same setting in the first vehicle. For example, if both vehicles are 2015 Toyota Corollas, then a seat position setting in the first vehicle will correspond to the same seat position setting in the second vehicle. Thus, in block 608, the ECU may determine that the corresponding component of the first vehicle should have the received optimal and/or adjusted setting if the first vehicle and the second vehicle are of the same type.

In some embodiments, the first vehicle and the second vehicle may be the same type of vehicle but may include different packages or be different models. For example, the first vehicle can be a Toyota Avalon XLE model and the second vehicle can be a Toyota Avalon Limited model. In that regard, the settings may directly correspond between the two vehicles or may be slightly different. For example, a seat position setting in the first vehicle may be implemented exactly the same in the second vehicle. In some embodiments, the ECU of the second vehicle may make minor adjustments to the settings prior to implementation in order to compensate for any geometrical differences between the two vehicles.

If the first vehicle and the second vehicle are of a similar type, then each setting of the second vehicle may still directly correspond to the same setting in the first vehicle or may correspond to a slight adjustment of the setting in the first vehicle. For example, if the first vehicle is a Toyota Corolla and the second vehicle is a Toyota Camry, then a seat position setting in the first vehicle may be implemented in the second vehicle. In some embodiments, the ECU of the second vehicle may adjust the seat position in the second vehicle to compensate for minor geometrical differences between the platforms.

If the first vehicle and the second vehicle are not of the same type, then each setting of the second vehicle may not directly correspond to the same setting in the first vehicle. For example, if the first vehicle is a Toyota Corolla and the second vehicle is a Toyota Tundra, then a seat position setting of the first vehicle may not directly correspond to a seat position setting of the second vehicle. Thus, in block 610, the ECU of the first vehicle may determine a new optimal and/or adjusted setting for the component of the first vehicle based on the received optimal and/or adjusted setting and geometrical differences between the first vehicle and the second vehicle.

For example, the second vehicle, a Toyota Tundra, may have uploaded adjusted settings of a driver's seat to the cloud. The ECU of the first vehicle, a Toyota Corolla, may determine geometrical differences between the Toyota Corolla and the Toyota Tundra. Referring briefly to FIG. 3, the vehicle 100 may be the Toyota Tundra. The ECU of the Toyota Corolla may determine that the distance 332 between the lower portion 306 of the driver's seat 302 and the front edge of the accelerator pedal 334 is typically 1 inch longer than the corresponding distance of the Toyota Corolla. Thus, when applying the settings uploaded by the Toyota Tundra to the Toyota Corolla, the ECU of the Toyota Corolla may subtract 1 inch from the stored setting corresponding to the distance 332.

In some situations, the functionality of block 610 may not be feasible due to the vast differences between vehicle types. For example, the cabin of the first vehicle may be significantly different than the cabin of the second vehicle. In some embodiments, the second vehicle may have uploaded body measurement data to the cloud. The first vehicle may retrieve the body measurement data from the cloud and determine an optimal setting for the component of the first vehicle based on the retrieved body measurement data.

In some embodiments, the second vehicle may have also uploaded the driver adjustment to the vehicle setting to the cloud. After determining the optimal setting for the component of the first vehicle, the ECU of the first vehicle may further adjust the component setting based on the received driver adjustment. For example, the driver may have adjusted a seat recline by increasing the angle by 2 degrees. The first vehicle may determine the optimal setting of the seat recline and then add the driver preferred additional 2 degrees to the optimal angle.

Some vehicle components may have similar settings regardless of the type of vehicle. For example, an HVAC system of a Toyota Corolla may have similar settings as an HVAC system of a Toyota 4Runner. Settings for components such as these may be directly applied to a first vehicle regardless of the type of the second vehicle and the type of the first vehicle.

Returning now to FIG. 6, the ECU of the first vehicle may control the component of the first vehicle to have the optimal and/or adjusted setting that was determined in block 608 and/or block 610. In some embodiments, the user may further adjust the component setting. In this regard, the ECU of the first vehicle may perform the functions of block 412, block 414 and block 416 of FIG. 4 after block 612 of FIG. 6.

In block 614, the ECU may transmit the user identifier, the type of the first vehicle, the optimal setting and/or the adjusted setting to the cloud to be stored. For example, the first vehicle may be of a different type than the second vehicle. In that regard, when the user drives a third vehicle of the same type as the first vehicle, the optimal and/or adjusted setting for that type of vehicle will also be stored in the cloud and the ECU of the third vehicle can automatically adjust the settings.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for setting a component of a vehicle for a driver or passenger comprising:
   a vehicle component having at least one user-adjustable setting;
   an input device configured to receive user input corresponding to a user-requested adjustment of the vehicle component;
   a sensor configured to detect body measurement data corresponding to a physical attribute of a user; and an electronic control unit (ECU) coupled to the vehicle component, the input device, and the sensor and configured to:
   determine an optimal setting for the vehicle component based on the body measurement data,
   control the vehicle component to have the optimal setting,
   determine or retrieve an acceptable range of settings of the vehicle component that is based on the body measurement data,
   determine whether a new component setting corresponding to the user-requested adjustment of the vehicle component from the optimal setting is outside of the acceptable range of settings of the vehicle component, and
   prevent the setting of the vehicle component from being outside of the acceptable range of settings.

2. The system of claim 1 further comprising a second sensor configured to detect upper body measurement data corresponding to an upper body physical attribute of the user and wherein the first body measurement data includes lower body measurement data corresponding to a lower body physical attribute of the user and the ECU is configured to determine the optimal setting for the vehicle component based on the upper body measurement data and the lower body measurement data.

3. The system of claim 1 wherein the body measurement data corresponds to at least one of an arm length, a torso length, a leg length, a height, an eye position, a shoulder-to-shoulder distance or a weight.

4. The system of claim 1 further comprising a second input device configured to receive an identifier of the user and a network access device configured to communicate with a cloud, wherein:
   the ECU is further configured to instruct the network access device to transmit the identifier of the user and user-preferred component settings including at least one of the optimal setting of the vehicle component or a new component setting corresponding to the user-requested adjustment of the vehicle component to the cloud for storage, and
   the user-preferred component settings can be retrieved by a second ECU of a second vehicle for setting a second vehicle component of the second vehicle to the user-preferred component settings in response to the second ECU identifying the user.

5. The system of claim 1 further comprising an output device coupled to the ECU and configured to output data and wherein the ECU is further configured to cause the output device to output data indicating that the new component setting may be unsafe in response to determining that the new component setting is outside of the acceptable range of settings.

6. A system for setting a component of a vehicle for a driver or passenger comprising:
   a vehicle component having at least one user-adjustable setting;
   at least one input device configured to receive body measurement data corresponding to a physical attribute of a user and to receive user input corresponding to a user-requested adjustment of the vehicle component; and
   an electronic control unit (ECU) coupled to the vehicle component and the input device and configured to:
      determine an optimal setting for the vehicle component based on the body measurement data,
      control the vehicle component to have the optimal setting,
      determine or retrieve an acceptable range of settings of the vehicle component that is based on the body measurement data,
      determine whether a new component setting corresponding to the user-requested adjustment of the vehicle component from the optimal setting is outside of the acceptable range of settings of the vehicle component, and
      prevent the setting of the vehicle component from being outside of the acceptable range of settings.

7. The system of claim 6 wherein the body measurement data includes upper body measurement data corresponding to an upper body physical attribute of the user and lower body measurement data corresponding to a lower body physical attribute of the user.

8. The system of claim 6 wherein the body measurement data corresponds to at least one of an arm length, a torso length, a leg length, a height, an eye position, a shoulder-to-shoulder distance or a weight.

9. The system of claim 6 further comprising a network access device configured to communicate with a cloud, wherein:
   the at least one input device is further configured to receive an identifier of the user,
   the ECU is further configured to instruct the network access device to transmit the identifier of the user and user-preferred component settings including at least one of the optimal setting of the vehicle component or a new component setting corresponding to the user-requested adjustment of the vehicle component to the cloud for storage, and
   the user-preferred component settings can be retrieved by a second ECU of a second vehicle for setting a second vehicle component of the second vehicle to the user-preferred component settings in response to the second ECU identifying the user.

10. The system of claim 6 further comprising an output device coupled to the ECU and configured to output data and wherein the ECU is further configured to cause the output device to output data indicating that the new component setting may be unsafe in response to determining that the new component setting is outside of the acceptable range of settings.

11. A method for setting and storing a user preference for a first component of a first vehicle and for implementing the user preference for a second component of a second vehicle comprising:
   receiving, by a first input device of the first vehicle, an identifier of a user of the first vehicle, the first input device including at least one of a key reader configured to detect the identifier from a key, an input/output port configured to receive the identifier from a remote device, or a biometric sensor configured to detect a biometric of the user such that the biometric is the identifier;
   receiving, by a first electronic control unit (ECU), body measurement data corresponding to a physical attribute of the user;
   determining, by the first ECU, an optimal setting of the first component for the user based on the body measurement data;
   transmitting, by a first network access device of the first vehicle, the identifier of the user and the optimal setting of the first component to a cloud;

receiving, by a second input device of the second vehicle, the identifier of the user;

transmitting, by a second network access device of the second vehicle, the identifier of the user to the cloud;

receiving, by the second network access device of the second vehicle, the optimal setting of the vehicle component based on the transmitted identifier of the user; and controlling, by a second ECU of the second vehicle, a setting of the second component of the second vehicle based on the received optimal setting of the first component of the first vehicle.

12. The method of claim 11 wherein the body measurement data is received from at least one of a sensor of the first vehicle configured to detect the body measurement data or from an input device of the first vehicle.

13. The method of claim 11 further comprising:

receiving, from a component input device of the first vehicle, a user-requested adjustment of the first component from the optimal setting;

determining, by the first ECU, whether a new setting of the first component corresponding to the user-requested adjustment of the vehicle component from the optimal setting is outside of an acceptable range of settings of the vehicle component based on the body measurement data; and outputting, by an output device of the first vehicle, data indicating that the new setting of the first component is outside of the acceptable range of settings in response to determining that the new setting is outside of the acceptable range of settings.

14. The method of claim 11 further comprising:

detecting, by a sensor of the second device, identification data corresponding to the user;

comparing, by the second ECU, the identification data corresponding to the user to the identifier of the user transmitted to the cloud to determine whether the identification data matches the identifier; and outputting, by an output device of the second vehicle, data requesting the user to provide another identifier if the identification data corresponding to the user is different than the identifier of the user.

15. The method of claim 11 wherein the first vehicle is a first type of vehicle and the second vehicle is a second type of vehicle and wherein controlling the setting of the second component of the second vehicle based is further based on geometric differences between the first type of vehicle and the second type of vehicle.

* * * * *

UNITED STATES PATENT AND TRADEMARK OFFICE
CERTIFICATE OF CORRECTION

PATENT NO. : 9,707,913 B1
APPLICATION NO. : 15/078476
DATED : July 18, 2017
INVENTOR(S) : Yuichi Ochiai et al.

Page 1 of 1

It is certified that error appears in the above-identified patent and that said Letters Patent is hereby corrected as shown below:

On the Title Page

Assignee should read:
(73) Assignee: Toyota Motor Engineering & Manufacturing North America, Inc. Erlanger, KY (US)

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*